United States Patent
Gschwend et al.

[15] 3,678,059
[45] July 18, 1972

[54] 3-AMINOALKYLIDENE-INDAZOLES

[72] Inventors: Heinz Werner Gschwend, Millburn; George De Stevens, Summit, both of N.J.

[73] Assignee: Ciba-Geigy Corporation, Summit, N.J.

[22] Filed: Oct. 7, 1969

[21] Appl. No.: 864,525

[52] U.S. Cl. ............260/295.5 B, 260/243 B, 260/247.5 B, 260/293.6, 260/296 B, 260/310 D, 260/311, 260/471 R, 260/268 BC, 424/246, 424/248, 424/250, 424/263, 424/264, 424/267, 424/273
[51] Int. Cl. ..................................................C07d 49/18
[58] Field of Search............260/310 C, 295.5 B, 311, 293.6

[56] References Cited

OTHER PUBLICATIONS

Behr In: Wiley Pyrazoles, Pyrazolines, Pyrazolidines, Indazoles and Condensed Rings, pp. 304– 305, N.Y., Interscience, 1967.
Meisenheimer et al., Berichte, Vol. 59, pp. 199– 202 (1926).
Dudykina et al., Chem. Abst., Vol. 57, Col. 12467 (1962).
Kazanbieva et al., Chem. Abst., Vol. 63, Col. 4272– 4273 (1965).
Kochetkov et al., Chem. Abst., Vol. 55, Col. 22292– 22293 (1961).
Snyder et al., Chem. Abst., Vol. 48, Col. 2035– 2036 (1954).
Burger Medicinal Chemistry 2nd ed., pp. 42, 43 and 497, N.Y., Interscience, 1960.

*Primary Examiner*—Natalie Trousof
*Attorney*—Harry Goldsmith, Joseph G. Kolodny and Mario A. Monaco

[57] ABSTRACT

3-Aminoalkylidene-indazoles, e.g. those of the formula

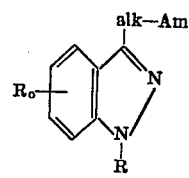

Am = an amino group
alk = lower alkylidene
R = araliphatic or aromatic radical
$R_o$ = H, OH, SH, alkyl, alkoxy, alkylmercapto, halogeno, $CF_3$, $NO_2$ or amino acyl derivatives, quaternaries and salts thereof are antidepressants.

6 Claims, No Drawings

3-AMINOALKYLIDENE-INDAZOLES

SUMMARY OF THE INVENTION

The present invention concerns and has for its object the provision of new 3-aminoalkylideneindazoles, more particularly those of Formula I

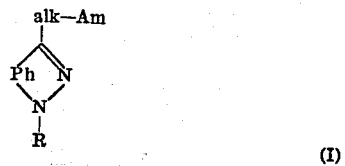

in which Am is an amino group, alk is lower alkylidene, Ph is a 1,2-phenylene radical and R is an araliphatic or aromatic radical, of acyl derivatives, quaternaries and salts thereof, as well as of corresponding pharmaceutical compositions and of methods for the preparation and application of these products. Said compositions are useful imipramaine-type antidepressants and antiinflammatory agents.

DESCRIPTION OF THE PREFERRED EMBODIMENTS

The 1,2-phenylene radical Ph and the iso- or heterocyclic aromatic radical R are unsubstituted or substituted by one or more than one, preferably by 1 or 2, of the same or of different substituents, for example, by lower alkyl, such as methyl, ethyl, n- or i-propyl or -butyl, free, etherified or esterified hydroxy or mercapto groups, such as lower alkoxy or alkylmercapto, e.g. methoxy, ethoxy, n- or i-propoxy or -butoxy, halogen, e.g. fluoro, chloro or bromo, trifluoromethyl, nitro or amino, especially di-lower alkylamino, e.g. dimethylamino or diethylamino. Preferred 1,2-phenylene radicals Ph are 1,2-phenylene, (lower alkyl)-1,2-phenylene, (hydroxy)-1,2-phenylene, (lower alkoxy)-1,2-phenylene, (lower alkylmercapto)-1,2-phenylene, (halogeno)-1,2-phenylene, (trifluoromethyl)-1,2-phenylene, (nitro)-1,2-phenylene (amino)-1,2-phenylene or (di-lower alkylamino)-1,2-phenylene, and the aralkyl or aryl radicals R are preferably monocyclic and represent, for example, Ar-lower alkyl and Ar, wherein Ar is phenyl, (lower alkyl)-phenyl, (hydroxy)-phenyl, (lower alkoxy)-phenyl, (lower alkylmercapto)-phenyl, (halogeno)-phenyl, (trifluoromethyl)-phenyl, (nitro)-phenyl, (amino)-phenyl, (di-lower alkylamino)-phenyl, pyridyl or (lower alkyl)-pyridyl. The term "lower" referred to above and hereinafter in connection with organic radicals or compounds respectively, defines such with up to seven, preferably up to four, carbon atoms.

The amino group Am is a primary, or preferably a secondary or tertiary amino group, such as amino, mono- or di-lower alkylamino, e.g. methylamino, ethylamino, n- or i-propylamino or n-butylamino; dimethylamino, N-methyl-N-ethylamino, deithylamino, di-n-propylamino, di-isopropylamino or di-n-butylamino; monocyclic 3 to 7 ring membered cycloalkylamino, cycloalkyl-lower alkylamino, N-cycloalkyl-N-lower alkylamino or N-cycloalkyl-lower alkyl-N-lower lower alkylamino, e.g. cyclopropylamino, cyclopentylamino, cyclohexylamino, cyclopropylmethylamino, 2-cyclopentylethylamino, N-cyclopentyl-N-methylamino, N-cyclohexyl-N-methylamino, N-cyclohexyl-N-ethylamino, N-cyclopentylmethyl-N-ethylamino or N-(2-cyclopentylethyl)-N-methylamino, Ar lower alkylamino or N-lower alkyl-N-Ar-lower alkylamino, e.g. benzylamino, 1- or 2-phenethyl amino, N-methyl-N-benzylamino, N-ethyl-N-benzylamino or N-ethyl-N-(1- or 2phenethyl)-amino or lower alkyleneimino, e.g. ethyleneimino, pyrrolidino, 2-methyl-pyrrolidino, piperidino, 2- or 4-methyl-piperidino 1,6- or 2,5-hexamethyleneimino, 1,7- or 2,6-heptamethyleneimino. The radicals attached to the amino-nitrogen atom can be substituted by hydroxy or amino, or interrupted by hetero atoms, e.g. oxygen, sulfur or nitrogen atoms, as is the case in the following amino groups further illustrating Am: hydroxylower alkylamino, N-(hydroxylower alkyl)-N-lower alkylamino, di-(hydroxylower alkyl)-amino or hydroxy-lower alkyleneimino, e.g. 2-hydroxyethylamino, 3- hydroxypropylamino, N-(2-hydroxyethyl)-N-methylamino or di-(2-hydroxyethyl)-amino, 3- or 4-hydroxy-piperi-dino, 3-hydroxymethyl-piperidino or 4-(2-hydroxyethyl)-piperidino, di-lower alkylamino-lower alkylamino, lower alkyleneimino-lower alkylamino, N-di-lower alkylamino-lower alkyl-N-lower alkylamino or N-lower alkyleneimino-lower alkyl-N-lower alkylamino, e.g. 2-diethylamino-ethylamino, 3-dimethylamino-propylamino, 2-pyrroli-dino ethylamino, N-(2-dimethylaminoethyl)-N-ethylamino, N-(3-piperidino-propyl)-N-methylamino or N-(2-pyrrolidinoethyl)-N-n-propylamino, or preferably monooxa-, monothia- or monoaza-lower alkyleneimino or N-lower alkyl-, N-hydroxylower alkyl-, N-Ar-lower alkyl- or N-Ar-monoaza-lower alkyleneimino, e.g. morpholino, 3-or 4-methyl-morpholino, thiamorpholino, piperazino, 4-(methyl, ethyl, n-propyl, i-propyl, 2-hydroxyethyl, 3-hdyroxypropyl, benzyl or phenyl)-piperazino, 3-(methyl, ethyl or n-propyl)-3-aza-1,5- or 1,6-hexyleneimino or 4-methyl-4-aza-1,7- or 2,6- heptyleneimino. In the above amino groups two hetero atoms are separated by at least two carbon atoms.

The lower alkylidene radical alk is preferably methylene, but also ethylidene, 1-or 2-propylidene, -butylidene, -pentylidene, -hexylidene or -heptylidene.

Acyl derivatives of the compounds of Formula I in which Am is primary or secondary amino, are preferably those derived from lower alkanoic, lower alkenoic, Ar-lower alkanoic or Ar-lower alkenoic acids, such as the acetyl, propionyl, butyryl or pivalyl; benzoyl, phenylacetyl or cinnamoyl derivatives.

Quaternaries are preferably lower alkyl- or Ar-lower alkylammonium salts, such as halides, sulfates or sulfonates, e.g. methyl-, ethyl- or benzylammonium chlorides, bromides, iodides, methyl- or ethylsulfates, methane, ethane or p-toluene sulfonates.

The compounds of the invention exhibit valuable pharmacological properties. Apart from antiinflammatory activity, they exhibit primarily antidepressant effects, as can be demonstrated in animal tests, using advantageously mammals, e.g. mice or rats, as test objects. They can be applied enterally or parenterally, e.g. in the form of aqueous solutions or suspensions, in the dosage range between about 0.1 and 50 mg/kg/day, preferably between about 0.5 and 25 mg/kg/day, advantageously between about 1 and 10 mg/kg/day. The antiinflammatory effects can be determined in the rat paw edema test system [Winter et al, Proc. Soc. Exp. Biol. & Med. III, 544 (1962)], wherein the compounds are applied by stomach tube to male and female animals and about 1 hour later an aqueous suspension of carrageenin is injected into the rats' paw and any antiinflammatory activity can be expressed by the reduction of the volume and/or weight of the edematous paw, as compared with the edematous paw volume or weight of untreated or placebo (saline) treated animals. The anti-depressant effects can be evaluated in the amphetamine potentiation test system (P. Carlton, Psycho-pharmacologia 1961, Vol. II, 364), wherein about 8 month old male rats are trained to press a bar every 30 seconds, in order to avoid an electric shock applied through the floor grid. In case the animals receive 0.25 mg/kg/day of amphetamine, their performing rate for avoiding said shocks during a period of about 2 ½ hours is higher than that of placebo treated animals. In case said animals receive the compounds of the invention intraperitoneally in the above dosages and about 45 minutes later the amphetamine, their rate of avoidance is highest, as compared with that of animals receiving (a) saline alone, (b) saline and amphetamine, or (c) saline and the compounds of the invention. Besides their above-mentioned utility, the compounds of this invention are also useful intermediates in the manufacture of other valuable, e.g. pharamcologically active, products.

Particularly useful are compounds of Formula I, in which Ph is 1,2-phenylene, (lower alkyl)-1,2-phenylene, (hydroxy)-1,2-phenylene, (lower alkoxy)-1,2-phenylene, (lower alkylmercapto)-1,2-phenylene, (halogeno)-1,2-phenylene, (trifluoromethyl)-1,2-phenylene, (nitro)-1,2-phenylene, (amino)-1,2-phenylene or (di-lower alkylamino)-1,2-phenylene, R is Ar-lower alkyl or Ar wherein Ar is phenyl, (lower alkyl)-phenyl, (hydroxy)-phenyl, (lower alkoxy)-phenyl, (lower alkylmercapto)-phenyl, (halogeno)-phenyl, (trifluoromethyl)-phenyl, (nitro-)-phenyl, (amino)-phenyl, (di-lower alkylamino)-phenyl, pyridyl or (lower alkyl)-pyridyl, Am is amino, mono- or di-lower alkylamino, 3 to 7 ring-membered cyclo-alkylamino, cycloalkyl-lower alkylamino, N-cycloalkyl-N-lower alkylamino, N-cycloalkyl-lower alkyl-N-lower alkylamino, Ar-lower alkylamino, N-lower alkyl-N-Ar-lower alkylamino, hydroxy-lower alkylamino, N-(hydroxylower alkyl)-N-lower alkylamino, di-(hydroxy-lower alkyl)-amino, di-lower alkylamino-lower alkylamino, lower alkyleneimino-lower alkylamino, N-di-lower alkylamino-lower alkyl-N-lower alkylamino, N-lower alkyleneimino-lower alkyl-N-lower alkylamino, lower alkyleneimino, hydroxylower alkyleneimino, monooxa-, monothia- or monoaza-lower alkyleneimino or N-(lower alkyl, hydroxylower alkyl, Ar-lower alkyl or Ar)-monoazo-lower alkyleneimino, wherein the heteroatoms are separated by at least 2 carbon atoms and alk is lower alkylidene or the N-lower alkanoyl, N-lower alkenoyl, N-Ar-lower alkanoyl or N-Ar-lower alkenoyl derivatives of the compounds in which Am contains at least one hydrogen atom attached to a nitrogen atom, the lower alkyl or Ar-lower alkyl quaternaries or acid addition salts thereof.

Preferred are the compounds of Formula II

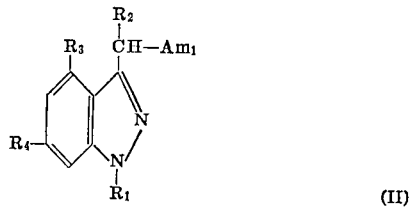

wherein $R_1$ is phenyl, (lower alkyl)-phenyl, (hydroxy)-phenyl, (lower alkoxy)-phenyl, (lower alkylmercapto)-phenyl, (halogeno)-phenyl, (trifluoromethyl)-phenyl, (nitro)-phenyl, (amino)-phenyl, (di-lower alkylamino)-phenyl, pyridyl or (lower alkyl)-pyridyl, $Am_1$ is amino, mono- or di-lower alkylamino, di-lower alkylamino-lower alkylamino, lower alkyleneimino-lower alkylamino, lower alkyleneimino, monooxa-, monothia- or monoaza-lower alkyleneimino or N-lower alkyl-monoaza-lower alkyleneimino, wherein the heteroatoms are separated by at least two carbon atoms, $R_2$ is hydrogen or lower alkyl and one of $R_3$ and $R_4$ is hydrogen and the other is hydrogen, lower alkyl, hydroxy, lower alkoxy, lower alkylmercapto, halogeno, tirfluoromethyl, nitro, amino or di-lower alkylamino, or therapeutically useful acid addition salts thereof.

Especially valuable are the compounds of Formula II wherein $R_1$ is phenyl, 4-(fluoro or chloro)-phenyl, $Am_1$ is methylamino, ethylamino, dimethylamino, diethylamino, 2-dimethylaminoethylamino, 3-dimethylamino-propylamino, pyrrolidino, piperidino or hexamethyleneimino, $R_2$ is hydrogen or methyl and one of $R_3$ and $R_4$ is hydrogen and the other is hydrogen or chloro, or therapeutically useful acid addition salts thereof.

Outstanding are those compounds of Formula II in which $R_1$ is phenyl or 4-fluorophenyl, $Am_1$ is dimethylamino, $R_2$ is hydrogen or methyl, $R_3$ is hydrogen and $R_4$ is hydrogen or chloro, or therapeutically useful acid addition salts thereof.

The compounds of the invention are prepared according to methods in themselves known. Advantageously they are obtained by converting in a compound of the Formula III

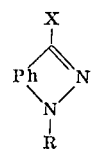

(III)

in which X is a substituent capable of being converted into alk-Am, X into said aminoalkylidene group and, if desired, converting any resulting compound into another compound of the invention.

A substituent capable of being converted into alk-Am is, for example, a corresponding cyano, carbamoyl, nitro-alkylidene or iminoalkylidene group (Schiff's base or oxime grouping). It can be converted into said amino-alkylidene group by reduction, for example, with the use of hydrogen or reducing agents, e.g. catalytically activated or nascent hydrogen, such as hydrogen in the presence of nickel, palladium or platinum catalysts or generated during electrolysis or in the reaction of metals, e.g. sodium or zinc, with hydrogen donors, e.g. alkanols or mineral acids respectively. Preferred reducing agents in the above reduction are simple or complex light metal hydrides, advantageously boron hydride or alkali metal boron or aluminum hydrides, e.g. sodium borohydride or lithium aluminum hydride.

Another group convertible into alk-Am is, for example, a reactively esterified hydroxyalkylidene group, e.g. such derived from hydrohalic, sulfuric or sulfonic acids, e.g. hydrochloric, hydrobromic, hydroiodic or sulfuric acid; methane, ethane, benzene or p-toluene sulfonic acid. The corresponding starting material is reacted with H-Am or a salt, e.g. alkali metal salt, thereof.

The compounds of the invention so obtained can be converted into each other according to known methods. For example, resulting compounds in which Am stands for a primary or secondary amino group, may be reacted with a reactive ester of a corresponding alcohol, e.g. alkanol or alkanediol, or may be acylated, for example, with a reactive functional derivative of a corresponding acid, such as a halide or anhydride thereof, or resulting acyl derivatives may be hydrolyzed, for example, with the use of acidic or alkaline hydrolyzing agents. Resulting tertiary amines may be quaternized in the usual manner, for example with the use of reactive esters of alcohols, preferably of lower alkanols, but also of aralkanols and the acids mentioned above.

The compounds of the invention are obtained in the free form or in the form of their salts, depending on the conditions under which the process is carried out; the salts are also included in the present invention. Salts that are obtained can be converted into the free bases in known manner, for example, with alkalis or ion exchangers. Free bases that are obtained can be converted into salts by reaction with inorganic or organic acids, especially those that are suitable for the formation of therapeutically useful salts. Such acids are, for example, mineral acids, e.g. hydrochloric, hydrobromic, sulfuric, phosphoric, nitric, or perchloric acid; aliphatic or aromatic carboxylic or sulfonic acids, e.g. formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxybenzoic, salicylic, 4-aminosalicyclic, embonic, nicotinic, methanesulfonic, ethanesulfonic, hydroxyethanesulfonic, ethylenesulfonic, halogen-benzenesulfonic, toluenesulfonic, naphthalenesulfonic and sulfanilic acid; methionine, tryptophane, lysine and arginine.

These or other salts of the invention, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The above reactions are carried out according to standard methods, in the presence or absence of diluents, preferably such as are inert to the reagents and are solvents thereof, of catalysts, condensing agents and/or inert atmospheres, at low temperatures, room temperature or advantageously elevated temperatures, at atmospheric or superatmospheric pressure.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. For example, the amines, alcohols or hydrazones mentioned above may be used in the form of their alkali metal, e.g. sodium or potassium salts. Mainly, those starting materials should be used in the process of the invention that lead to the formation of those compounds indicated above as being specially valuable.

The starting material used is known or, if new, can be prepared either according to the known method (a) or the new method (b). For example, it can be obtained by reacting either (a) a H-Ph-glyoxylic acid derivative, e.g. an ester or the nitrile thereof, or (b) an ortho-halogeno-lower alkanophenone, with an R-hydrazine, and closing (a) the hydrazone of the acid derivative obtained with the aid of lead tetraacetate and boron trifluoride, or (b) the hydrazone of the alkanophenone, advantageously in the form of its alkali metal salt, in an inert solvent, preferably at elevated temperatures. Any resulting 1-R-indazole-3-carboxylic acid derivative from a), e.g. the ester, is then converted into the corresponding amide, for example by reaction with H-Am, or said amide is prepared via the acid or its halide. The acid or its derivatives can also be reduced to the corresponding aldehyde or alcohol, e.g. according to Rosenmund or with the use of complex light metal hydrides, e.g. lithium aluminum hydride, any resulting aldehyde converted into the Schiff's base or oxime or any resulting alcohol dehydrogenated to the aldehyde again or converted into a reactive ester thereof. Any resulting 1-R-3-lower alkyl indazole from (b) can be halogenated in the α-position of the alkyl group, for example, with the use of an N-halo-succinimide, in order to obtain the corresponding 3-α-haloalkyl starting material. The latter can be converted into the corresponding 1-R-3-(α-hydroxy or nitro-alkyl)- indazoles, for example, with the use of strong alkalies or silver nitrate respectively. Any resulting 3-α-hydroxyalkyl compound can be reactively esterified with acids other than hydrohalic acids or oxidized to the corresponding aldehydes, ketones or acids, for example, with hydrogen peroxide, alkali metal chromates or permanganates, mercuric, manganese or silver oxide in acidic or alkaline media. Resulting acids can be converted into the corresponding amides as shown above, and the aldehydes or ketones reacted with H-Am or hydroxylamine, in order to obtain the Schiff's base or oxime starting material.

The pharmacologically active compounds of the invention are useful in the manufacture of pharmaceutical compositions containing an effective amount thereof in conjunction or admixture with excipients suitable for either enteral or parenteral application. Preferred are tablets and gelatin capsules comprising the active ingredient together with (a) diluents, e.g. lactose, dextrose, sucrose, mannitol, sorbitol, cellulose and/or glycine, (b) lubricants, e.g. silica, talcum, stearic acid, its magnesium or calcium salt and/or polyethyleneglycol, for tablets also (c) binders, e.g. magnesium aluminum silicate, starch paste, gelatin, tragacanth, methylcellulose, sodium carboxymethylcellulose and/or polyvinylpyrrolidone, if desired, (d) disintegrants, e.g. starches, agar, alginic acid or its sodium salt, enzymes of the binders or effervescent mixtures and/or (e) adsorbents, colorants, flavors and sweeteners. Injectable compositions are preferably aqueous isotonic solutions or suspensions, and suppositories are advantageously fatty emulsions or suspensions. They may be sterilized and/or contain adjuvants, such as preserving, stabilizing, wetting or emulsifying agents, solution promoters, salts for regulating the osmotic pressure and/or buffers. Said pharmaceutical compositions may also contain other therapeutically valuable substances. They are prepared according to conventional mixing, granulating or coating methods respectively and contain about 0.1 to 75 percent, preferably about 1 to 50 percent, of the active ingredient.

The following examples are intended to illustrate the invention and are not to be construed as being limitations thereon. Temperatures are given in degrees Centigrade, and all parts wherever given are parts by weight.

EXAMPLE 1

The solution of 12.8 g 1-(4-fluorophenyl)-indazole-3-carboxylic acid dimethylamide in 200 ml dry tetrahydrofuran is added dropwise to 100 ml 1N borane in tetrahydrofuran while stirring under nitrogen. After the addition is completed, the mixture is refluxed for 2 ½ hours and cooled. Hereupon 60 ml 5N hydrochloric acid are added dropwise and the mixture is concentrated under atmospheric pressure. The aqueous concentrate is made basic with sodium carbonate and extracted with methylene chloride. The extract is dried, evaporated, and the residue taken up in acetone. The solution is neutralized with ethereal hydrochloric acid, to yield the 1-(4-fluorophenyl)-3-dimethylaminomethyl-indazole hydrochloride of the formula

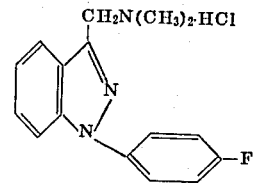

melting at 191°–193°.

The starting material is prepared as follows: The mixture of 45 g methyl phenylglyoxylate, 45 g 4-fluorophenyl-hydrazine hydrochloride, 27 g sodium acetate and 1.5 liter ethanol is refluxed for 24 hours while stirring. It is filtered hot, the filtrate cooled and the precipitate formed filtered off, to yield the methyl phenylglyoxylate 4-fluorophenyl-hydrazone, melting at 88°–90°.

The solution of 62 g thereof in 2 liters methylene chloride is added dropwise to the solution of 112 g lead tetraacetate in 1.2 liter methylene chloride while stirring and cooling with ice. The mixture is stirred for 2 hours at room temperature, whereupon 1 liter water is added while stirring. The mixture filtered with the aid of infusorial earth, the filtrate washed with water and aqueous sodium bicarbonate, dried and concentrated to about 800 ml. To the concentrate, 280 ml borontrifluoride-etherate are added, and the mixture refluxed for 5 ½ hours. After cooling, water is added dropwise, the organic layer separated, washed with aqueous sodium bicarbonate, dried and evaporated. The residue is re-crystallized from ethanol, to yield the 1-(4-fluorophenyl)-indazole-3-carboxylic acid methyl ester melting at 127°–129°.

The mixture of 51.5 g thereof, 350 ml ethanol, 350 ml water and 190 ml N aqueous sodium hydroxide is stirred at 80° for 3 hours and stirred overnight at room temperature. It is concentrated in vacuo, the concentrate acidified with 195 ml N hydrochloric acid and 1 liter water is added. The precipitate formed is filtered off and dried in vacuo, to yield the corresponding acid melting at 189°–191°.

The mixture of 12 g thereof and 100 ml thionyl chloride is refluxed for 2 hours and evaporated in vacuo. The residue is taken up in 350 ml methylene chloride and dimethylamine is bubbled through the solution for 3 ½ hours. The mixture is then washed with aqueous sodium carbonate, dried and evaporated, to yield the 1-(4-fluorophenyl)-indazole-3-carboxylic acid dimethylamide, which is used as such without further purification.

EXAMPLE 2

In the exactly analogous manner shown in Example 1, one obtains the following compounds of Formula II from equivalent amounts of the corresponding starting material: $R_2 = R_3 = R_4 = H$

| $R_1$ | $AM_1$ | Salt | m.p. |
|---|---|---|---|
| phenyl | methylamino | HCl | 187–189° |

| | | | |
|---|---|---|---|
| " | dimethylamino | HCl | 196–197° |
| " | pyrrolidino | HCl | 167–169° |
| 4-fluorophenyl | methylamino | HCl | 208–210° |
| " | pyrrolidino | HCl | 219–221° |
| " | piperidino | HCl | 253–255° |
| " | hexamethyleneimino | HCl | 191–193° |
| 4-chlorophenyl | methylamino | HCl | 212–214° |
| " | dimethylamino | HCl | 230–232° |
| " | diethylamino | HCl | 182–184° |
| " | 3-dimethylamino-propylamino | 2HCl | 225° |
| " | pyrrolidino | HCl | 227–229° |
| " | piperidino | HCl | 251–253° |
| " | hexamethyleneimino | HCl | 212–214° |

Several of the corresponding intermediates have the following characteristics:

| | | m.p. |
|---|---|---|
| a. | methyl phenyglyoxylate phenylhydrazone | 82–84° |
| | methyl phenyglyoxylate 4-chlorophenylhydrazone | 102–104° |
| b. | 1-phenyl-indazole-3-carboxylic acid methyl ester | 74–77° |
| | 1-(4-chlorophenyl)-indazole-3-carboxylic acid methyl ester | 124–125° |
| c. | 1-phenyl-indazole-3-carboxylic acid | 176–178° |
| | 1-(4-chlorophenyl)-indazole-3-carboxylic acid | 214–216° |
| d. | 1-(4-fluorophenyl)-indazole-3-carboxylic acid diethylamide | 111° |
| | 1-(4-chlorophenyl)-indazole-3-carboxylic acid 3-dimethylaminopropylamide | 97–99° |

EXAMPLE 3

The solution of 4 g 1-(4-fluorophenyl)-3-bromoethylidene-6-chloroindazole in 150 ml dry tetrahydrofuran is saturated with dimethylamine and the mixture allowed to stand at room temperature overnight. It is evaporated in vacuo, the residue taken up in methylene chloride, the solution washed with aqueous sodium carbonate, dried, filtered and evaporated. The residue is taken up in 20 ml acetone and the solution neutralized with 3.3N ethereal hydrogen chloride, to yield the 1-(4-fluorophenyl)-3-dimethylamino-ethylidene-6-chloroindazole hydrochloride of the formula

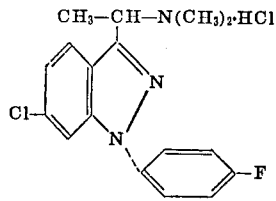

melting at 193°–195°.

The starting material is prepared as follows: To the mixture of 176.4 g 1,3-dichlorobenzene, 58.8 g anhydrous aluminum chloride and 400 ml carbon disulfide, 37 g propionyl chloride are added dropwise while stirring and keeping the temperature at 0°. Hereupon the mixture is refluxed for 24 hours and cooled again to 0°. It is decomposed with water, diluted with methylene chloride, the organic solution separated and the aqueous phase extracted with methylene chloride. The combined organic solutions are washed with aqueous sodium carbonate, dried, filtered and evaporated in vacuo. The residue is distilled and the fraction boiling at 135°–136°/12 mm Hg collected, to yield the 2,4-dichloro-propiophenone.

The mixture of 20.3 g thereof, 19.5 g anhydrous sodium acetate, 17.11 g 4-fluorophenyl-hydrazine hydrochloride and 350 ml ethanol is refluxed for 20 hours and filtered hot. The filtrate is evaporated, the residue taken up in methylene chloride, the solution washed with aqueous sodium carbonate, dried, filtered and evaporated, to yield the liquid 2,3-dichloropropiophenone-N'-(4-fluorophenyl)-hydrazone.

The mixture of 31 g thereof, 735 ml diethyleneglycol dimethylether and 2.64 g sodium hydride (prepared by washing a 55 percent suspension thereof in mineral oil 2 times with diethyl ether) is refluxed for one hour while stirring. It is evaporated in vacuo, the residue taken up in diethyl ether, the mixture washed with water, dried, filtered, evaporated and the residue recrystallized from diethylether-hexane, to yield the 1-(4-fluorophenyl)-3-ethyl-6-chloroindazole melting at 64°.

The mixture of 10 g thereof, 450 ml carbon tetrachloride and 6.5 g N-bromosuccinimide is refluxed for 2 ½ hours while stirring and irradiating for 45 minutes with a 150 W flood lamp. After cooling, it is filtered, the filtrate evaporated and the residue recrystallized from diethyl ether-hexane, to yield the 1-(4-fluorophenyl)-3-bromoethylidene-6-chloroindazole melting at 152°–155°.

EXAMPLE 4

According to the method described in Example 3, the following compounds of Formula II are obtained from equivalent amounts of the corresponding starting materials: $R_2 = CH_3$, $R_3 = H$.

| $R_1$ | $Am_1$ | $R_4$ | Salt | m.p. |
|---|---|---|---|---|
| phenyl | methylamino | Cl | HCl | 182–184° |
| " | dimethylamino | Cl | HCl | 198–200° |
| " | pyrrolidino | Cl | HCl | 150–152° |
| 4-fluorophenyl | methylamino | Cl | HCl | 196–198° |
| " | pyrrolidino | Cl | HCl | 138–140° |
| 4-chlorophenyl | methylamino | Cl | HCl | 181–183° |
| " | pyrrolidino | H | HCl | 186–188° |

EXAMPLE 5

Preparation of 10,000 tablets each containing 50.0 mg of the active ingredient:

Formula:

| | |
|---|---|
| 1-(4-fluorophenyl)-3-dimethylamino-methyl-indazole hydrochloride | 500.00 g |
| Lactose | 1,706.00 g |
| Corn Starch | 90.00 g |
| Polyethylene glycol 6,000 | 90.00 g |
| Talcum powder | 90.00 g |
| Magnesium stearate | 24.00 g |
| Purified water | q.s. |

Procedure:

All the powders are passed through a screen with openings of 0.6 mm. Then the drug substance, lactose, talcum, magnesium stearate and half of the starch are mixed in a suitable mixer. The other half of the starch is suspended in 45 ml water and the suspension added to the boiling solution of the polyethylene glycol in 180 ml water. The paste formed is added to the powders which are granulated, if necessary, with an additional amount of water. The granulate is dried overnight at 35°, broken on a screen with 1.2 mm openings and compressed into tablets using concave punches with 7.1 mm diameter, uppers bisected.

EXAMPLE 6

Preparation of 10,000 capsules each containing 100.0 mg of the active ingredient:

Formula:

| | |
|---|---|
| 1-(4-fluorophenyl)-3-dimethylamino-methyl-6-chloroindazole hydrochloride | 1,000.0 g |
| Lactose | 2,800.0 g |
| Talcum powder | 200.0 g |

Procedure:

All the powders are passed through a screen with an opening of 0.6 mm. Then the drug substance is placed in a suitable mixer and mixed first with the talcum, then with the lactose until homogenous. No. 1 capsules are filled with 400 mg, using a capsule filling machine.

We claim
1. A compound having the formula

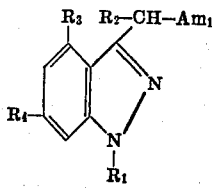

in which $R_1$ is phenyl, (lower alkyl)-phenyl, (halogeno)-phenyl or (trifluoromethyl)-phenyl, $Am_1$ is amino, mono- or di-lower alkylamino, di-lower alkylamino-lower alkylamino, wherein the nitrogen atoms are separated by at least two carbon atoms, or 5 to 7 ring-membered lower alkyleneimino, $R_2$ is hydrogen or lower alkyl and one of $R_3$ and $R_4$ is hydrogen and the other is hydrogen, lower alkyl, halogeno or trifluoromethyl, or the therapeutically useful acid addition salts thereof.

2. A compound as claimed in claim 1, in which formula $R_1$ is phenyl, 4-(fluoro or chloro)-phenyl and $Am_1$ is methylamino, ethylamino, dimethylamino, diethylamino, 2-dimethylamino-ethyl-amino, 3-dimethylamino-propylamino, pyrrolidino, piperidino or hexamethyleneimino, $R_2$ is hydrogen or methyl and one of $R_3$ and $R_4$ is hydrogen and the other is hydrogen or chloro, or therapeutically useful acid addition salts thereof.

3. A compound as claimed in claim 1, in which formula $R_1$ is phenyl or 4-fluorophenyl, $Am_1$ is dimethylamino, $R_2$ is hydrogen or methyl, $R_3$ is hydrogen and $R_4$ is hydrogen or chloro or therapeutically useful acid addition salts thereof.

4. A compound as claimed in claim 1 and being the 1-(4-fluorophenyl)-3-dimethylaminomethyl-indazole or a therapeutically useful acid addition salt thereof.

5. A compound as claimed in claim 1 and being the 1-(4-fluorophenyl)-3-dimethylaminomethyl-6-chloroindazole or a therapeutically useful acid addition salt thereof.

6. A compound as claimed in claim 1 and being the 1-phenyl-3dimethylaminomethyl-6-chloroindazole or a therapeutically useful acid addition salt thereof.

* * * * *